United States Patent [19]
Waters

[11] 3,921,126
[45] Nov. 18, 1975

[54] METHOD OF SEISMICALLY DELINEATING THE PERMEABLE EXTENT OF OIL-CONTAINING FORMATIONS

[75] Inventor: Kenneth H. Waters, Ponca City, Okla.

[73] Assignee: Continental Oil Company, Ponca City, Okla.

[22] Filed: Aug. 21, 1974

[21] Appl. No.: 499,388

[52] U.S. Cl...... 340/15.5 CP; 340/15.5 R; 166/268; 166/250
[51] Int. Cl.$^2$............................................ G01V 1/00
[58] Field of Search ..... 166/268, 250; 340/15.5 CP, 340/15.5 R

[56] References Cited
UNITED STATES PATENTS
3,131,760  5/1964  Arendt et al........................ 166/268

Primary Examiner—Maynard R. Wilbur
Assistant Examiner—H. A. Birmiel
Attorney, Agent, or Firm—William J. Miller

[57] ABSTRACT

A first seismic survey of an exploration area is conducted thereby giving the reflection characteristics of subsurface layering followed by the introduction of gas into one or more selected formations so that the gas is caused to flow into and through the permeable portions thereof, the gas having the characteristic of increasing amplitudes of seismic signals from the formations when it is present therein. A second seismic survey of the exploration area is conducted after the introduction of gas thereinto and the first and second seismic survey results are compared to delineate the locations of gas in the formations and the permeable extent thereof.

10 Claims, 4 Drawing Figures

3,921,126

1

METHOD OF SEISMICALLY DELINEATING THE PERMEABLE EXTENT OF OIL-CONTAINING FORMATIONS

BACKGROUND OF THE INVENTION

1. Field of the Invention

The present invention relates to the field of seismic exploration, and more particularly, but not by way of limitation, to methods of seismically delineating the permeable extent of oil-containing formations.

2. Description of the Prior Art

A great variety of methods and apparatus relating to the art of reflection type seismic prospecting have been developed and used heretofore. Generally, seismic prospecting or exploration involves creating a seismic disturbance at or near the surface of the earth thereby generating various types of seismic waves or signals which travel through the earth. Upon striking interfaces between different geological formations, the waves are partially reflected back to the surface of the earth where they are detected and recorded by seismograph equipment. The purpose of detecting the reflected waves is to determine the depth of geological formations beneath the surface of the earth and discover their stratigraphic and structural features. However, in addition to the vertical or substantially vertical reflections which are of interest and convey the desired information, undesired energy returns brought about by refraction, diffraction, scatter, etc., also reach the seismograph detecting and recording equipment. The undesired returned energy is commonly designated as "interference" or "noise". While methods have been developed for eliminating such undesired seismic energy and recording desired reflections with higher signal-to-noise ratio, the data obtained from seismic surveys still requires interpretation by geologists in order to predict the critical areas where oil might be deposited or trapped in the subterranean formations, which interpretation is subject to error. By the present invention, methods of seismically delineating the permeable extent of oil-containing formations are provided whereby after an initial seismic survey has been conducted and a well bore penetrating the oil-containing formation drilled, the permeable extent of the formation, i.e., the high oil productive zones thereof, can be delineated with more objectivity and a greater accuracy.

SUMMARY OF THE INVENTION

This invention provides methods of delineating the permeable extent of a subterranean oil-containing formation penetrated by a well bore comprising the steps of conducting a first seismic survey of the exploration area thereby giving the reflection characteristics of the subsurface layering to obtain a first set of data, introducing gas into the relevant formations through the well bore whereby the gas is caused to flow into and through permeable portions of the formations, the gas having the characteristic of increasing the amplitudes of reflections of seismic signals from the formations when present therein, conducting a second seismic survey of the exploration area after the introduction of the gas to obtain a second set of data representing the reflection characteristics of the gas laden subsurface formations, and comparing the first and second sets of data to identify changes in the reflection of seismic signals obtained in said second survey thereby delineating

2 the locations of the gas in the formations and the permeable extent thereof.

It is, therefore, an object of the present invention to provide methods of seismically delineating the permeable extent of oil-containing formations.

A further object of the present invention is the provision of methods for accurately determining the areas in an oil-containing formation or reservoir of high permeability which are likely to be highly productive in oil so that well bores can be drilled and completed in such areas.

Yet a further object of the present invention is the provision of methods of determining if an oil-containing formation penetrated by a well bore includes other or more productive zones which have not been revealed by preliminary seismic surveys, into which one or more additional well bores should be drilled.

Other and further objects, features and advantages of this invention will become apparent as the following detailed description of the invention is read in conjunction with the accompanying drawings.

DESCRIPTION OF THE PREFERRED EMBODIMENTS

Figure 1:
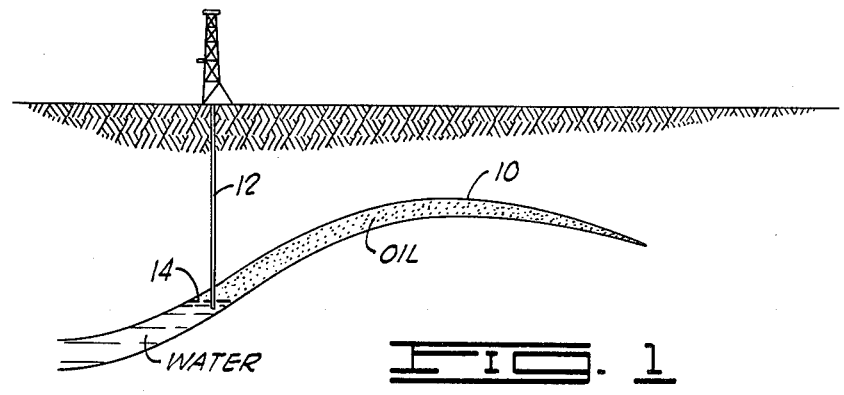
FIG. 1 is a schematic illustration of a subterranean formation penetrated by a well bore containing oil and water.

The methods of the present invention for delineating the permeable extent of subterranean oil-containing formations involve carrying out or conducting seismic surveys of an exploration area whereby data is obtained in the form of a profile of one or more formations in the area showing the depth and longitudinal lengths thereof. Vibration seismic methods of the basic type described and claimed in U.S. Pat. Nos. 2,688,124, 2,808,577 and 2,874,795 which are all assigned to the assignee of this present invention are particularly suitable and are preferred for use in accordance with the methods of this invention. Further, the type of data acquired by the technique known as "common depth point stacking", or "CDP" is particularly suitable for use in accordance with the present invention. CDP data is acquired by generating a seismic signal and receiving reflected portions thereof, repositioning the generator and generating a new signal which is reflected from the same point of the subterranean strata as was the first signal and repeating the repositioning, generating and receiving signals, so that as many signals as possible are generated and received along different paths, all being reflected from a common point on the subterranean strata. In processing the seismic data, care is taken that the relative amplitudes of the reflections are not disturbed both in a horizontal direction and at different times on the same trace. Such a procedure is well known as Relative Amplitude Processing. U.S. Pat. No. 3,496,531 issued to Sullivan et al. on Feb. 17, 1970, which is also assigned to the assignee of this invention, describes methods and apparatus for analyzing the data from seismic signal reflection detectors and producing data of the stacked common depth point type.

The methods of the present invention are based on the fact that the amplitudes of seismic reflections from a subterranean formation containing certain gases are greater than the amplitudes of seismic reflections from the same formation containing oil or water or both. In accordance with the present invention a seismic survey of an exploration area is conducted to obtain data of the stacked CDP type illustrating the depth profile of one or more formations in the area. A gas having the characteristic of increasing the amplitudes of reflections of seismic signals from the formations when present therein is then introduced into the formations so that the gas is caused to flow into and through permeable portions thereof displacing oil and/or water contained therein. A second seismic survey of the area is then carried out and additional CDP data illustrating the depth profile of the formation is obtained. The data from the second survey is compared with the data from the first survey to identify changes, i.e., increases in the amplitudes of reflections of seismic signals obtained, thereby delineating the locations of gas in the formations and the permeable extents thereof. As will be understood, the gas travels through the formations by way of paths of maximum permeability and the delineation of the paths followed by the gas and the areas where the gas accumulates in the formations indicates the zones of high oil productivity. As a result of such indication, well bores can be drilled and completed in such zones and the gas contained therein withdrawn resulting in high oil production wells.

Figure 2:
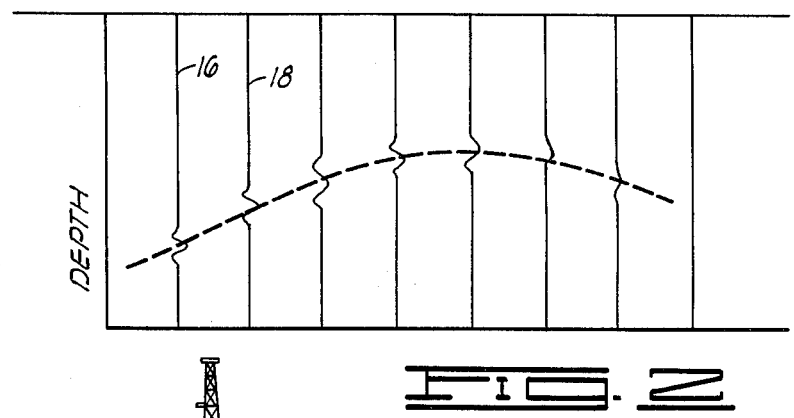
FIG. 2 illustrates a seismic depth profile of the formation of FIG. 1 compiled from stacked common point seismic data.

Referring now to the drawings and particularly to FIG. 1, a typical subterranean formation 10 is illustrated containing oil and water. A seismic profile of the formation 10 obtained by conducting a seismic survey thereof and applying the CDP stacking technique to the data obtained is illustrated in FIG. 2. For purposes of this disclosure, let it be assumed that the well bore 12 penetrates the formation 10 at a location which is marginal in oil production. For example, as shown in FIG. 1, if the oil-water interface 14 is at or near the point where the well bore 12 penetrates the formation 10, marginal quantities of oil along with quantities of water will be produced through the well bore 12. The interpretation of the data represented by the depth profile of the formation 10 (FIG. 2) indicates that the location of the well bore 12 is correct. That is, the amplitudes of the stacked seismic reflection data shown would more than likely be interpreted to mean that the optimum point for drilling a well bore 12 is between lines 16 and 18 where the amplitudes of the seismic reflections from the formation are the greatest due to greater thickness in the reservoir sand. In situations similar to the foregoing or other situations where a well bore is drilled into an oil-containing formation at a sub-optimum location due to faulty interpretation of the seismic data, additional well bores may be drilled at different locations based on a new interpretation of the seismic data, or the entire formation may be abandoned without further seismic testing. By the present invention, methods are provided for relatively accurately determining the permeable extent of the formation 10 so that additional well bores drilled into the formation can be located at optimum points, or so that confirming data is obtained supporting a decision to abandon the formation.

Figure 3:
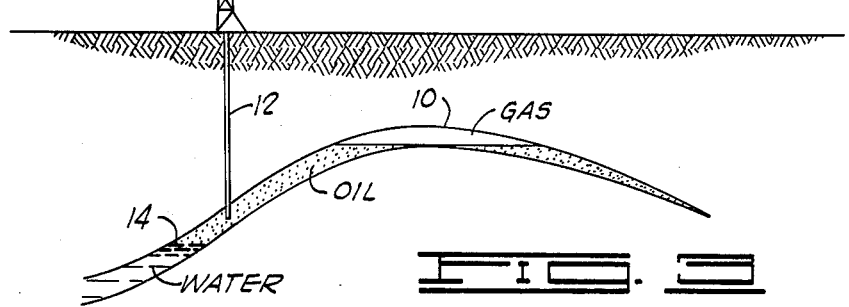
FIG. 3 is a schematic representation of the subterranean formation of FIG. 1 after the introduction of gas thereinto.
Figure 4:
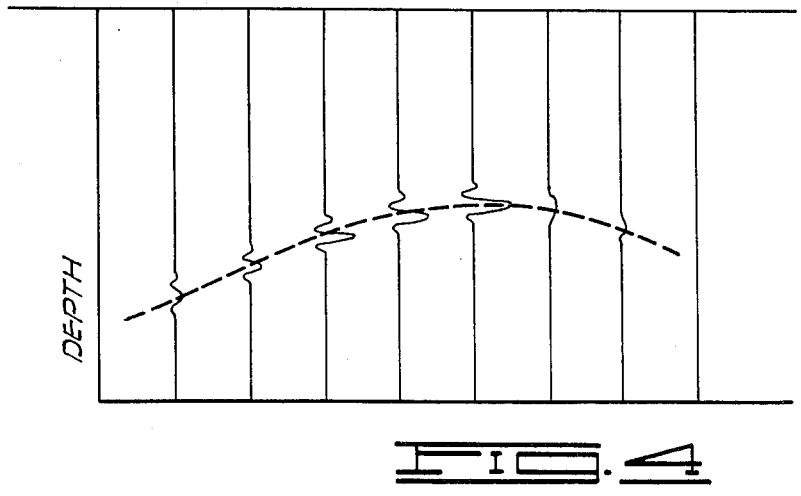
FIG. 4 is a seismic depth profile of the formation for FIG. 3 compiled from stacked common point seismic data.

Referring now to FIGS. 3 and 4, in accordance with the present invention, a gas having the characteristic of increasing the amplitudes of reflections of seismic signals from the formation when present therein is introduced into the formation 10. While a variety of gases can be utilized, it is preferred that the gas be of a type which does not react or combine with materials contained in the formation, nor should the gas be liquefiable at the pressures and temperatures prevailing in the formations. For example, the gas should not be absorbed or dissolved in oil or water contained in the formation nor should the gas have a reactivity with oil, water or the strata of which the formation is formed. Further, the gas introduced into the formation should flow through and along paths of high permeability in the formation and reach stratigraphic traps in the formation so that oil and water contained therein are displaced downwardly. In this regard, the lighter the gas utilized the more readily it will find its way or rise to the top of the formation. Examples of particularly suitable gases are hydrogen, helium, nitrogen or oxygen.

After the introduction of the gas into the formation 10 in a quantity sufficient to displace oil and water from the top of the formation as shown in FIG. 3, a second seismic survey of the formation is conducted. A second depth profile of the formation as shown in FIG. 4 is compiled using the CDP stacking technique. Due to the presence of the gas in the formation 10, the amplitudes of the seismic reflections obtained from the formation are increased at the point in the formation where the gas is located. A comparison between the seismic profile obtained from the first survey and seismic profile from the second survey readily reveals the increased amplitudes at the gas locations and thereby pinpoints the locations of the gas and the locations of high permeability in the formation 10. In the circumstances illustrated in the drawings and described above, the seismic profile obtained as a result of the second survey (FIG. 4) clearly shows that a well bore drilled into the stratigraphic trap or the apex of the formation 10 will result in high oil productivity as compared to the location of the well bore 12.

In another aspect of the present invention, if it is desired to delineate the paths followed by the gas into and through the formation while it is being introduced therein, a series of seismic surveys can be carried out on the formation during the introduction and migration of the gas. This results in successive sets of seismic data being obtained over the time period during which the gas migrates through the formation, which are compiled into time-related seismic profiles similar to those illustrated in FIGS. 2 and 4. The successive sets of data are then compared with the first set of seismic data obtained from the first survey to determine the location of the gas at different points in time during the introduction thereof into the formation which delineates the path or paths followed by the gas into and through the formation.

As will be apparent, the methods of the present invention can be carried out to determine the permeable extent of oil-containing formations into which a well bore has previously been drilled, but from which the oil production is marginal. In addition, the methods can be applied to the exploration of new fields by conducting a first seismic survey to obtain initial seismic data relating to oil-containing formations or reservoirs therein. From the initial set of data the apparent location for drilling a well bore into the formation is determined and a well bore penetrating the formation is drilled. If the production from the first well is marginal, or when it is desired to drill additional well bores into the formation, the methods of the present invention can be utilized to determine the permeable extent of the oil-containing formation and the optimum location or locations of additional well bores. That is, gas is introduced into the formation and one or more additional seismic surveys conducted in the manner described above to delineate the permeable extent of the formation.

In carrying out the methods of the present invention, it is necessary that the conditions of the initial survey, i.e., locations of the seismic signal generator and seismic reflection detectors be duplicated as closely as possible in carrying out subsequent surveys. Obviously, if the locations of the seismic equipment and other conditions affecting a subsequent survey are not the same as the first survey a comparison therebetween will not accurately reveal increases in the amplitudes of reflections due to the presence of gas in the formation. A particularly suitable procedure for insuring duplication of survey conditions is to leave the detectors coupled to the earth's surface after carrying out the first seismic survey and carefully mark the locations where the seismic signals were generated during the first survey. Subsequent surveys are then carried out by positioning the seismic signal generator at the same locations utilized in the first survey with the detectors continuously remaining in their original position. In order to obtain consistency of output of the signal generators, the vibrational seismic survey method of obtaining the seismic data mentioned above is preferably used.

The seismic data obtained by applying the methods of the present invention to a particular oil reservoir results in the delineation of the paths taken by the gas through the most permeable portions of the formation while being introduced therein and the locations of stratigraphic traps in which the gas accumulates. This delineation of the permeable extent of the formation has a great utility in effectively producing the formation, not only in locating additional well bores, but in determining optimum secondary recovery and other production stimulation procedures which should be applied to the formation.

The present invention, therefore, is well adapted to carry out the objects and attain the ends and advantages mentioned as well as those inherent therein. While presently preferred procedures for analyzing the seismic data obtained and applying the methods of the invention to determine the permeable extent of an oil-containing reservoir have been described for purposes of this disclosure, it will be readily apparent to those skilled in the art that a variety of data analyzing procedures and seismic prospecting techniques may be utilized and changes may be made in the combination and arrangement of steps as heretofore set forth without departing from the spirit and scope of the invention as defined in the following claims.

What is claimed is:

1. A method of delineating the permeable extent of a subterranean oil-containing formation penetrated by a well bore comprising the steps of:

conducting a first seismic survey of said formation to obtain a first set of data representing reflections of seismic signals therefrom;

introducing gas in said formation through said well bore whereby said gas is caused to flow into and through permeable portions of said formation, said gas having the characteristic of increasing the reflection of seismic signals from said formation when present therein;

conducting a second seismic survey of said formation after the introduction of said gas therein to obtain a second set of data representing reflections of seismic signals therefrom; and comparing said first and second sets of data to identify changes in the reflections of seismic signals obtained in said second survey thereby delineating the locations of said gas in said formation and the permeable extent thereof.

2. The method of claim 1 which is further characterized to include the steps of:

conducting a series of seismic surveys of said formation while said gas is being introduced therein to obtain successive sets of data representing reflections of seismic signals therefrom; and comparing said successive sets of data with said first set of data to identify changes in the reflections of seismic signals obtained thereby delineating the paths traveled by said gas in said formation.

3. The method of claim 1 wherein the gas does not liquefy at the temperatures and pressures present in said formations.

4. The method of claim 1 wherein said gas is of a type which does not substantially react or combine with oil, water or other materials contained in said formation.

5. The method of claim 1 wherein said gas is selected from the group consisting of hydrogen, helium, nitrogen and oxygen.

6. A method of delineating the permeable extent of a subterranean oil-containing formation comprising the steps of:

conducting a first seismic survey of said formation to obtain a first set of data representing reflections of seismic signals therefrom;

penetrating said formation with a well bore;

introducing gas into said formation through said well bore whereby said gas is caused to flow into and through permeable portions of said formation, said gas having the characteristic of increasing the reflection of seismic signals from said formation when present therein;

conducting a second seismic survey of said formation after the introduction of said gas therein to obtain a second set of data representing reflections of seismic signals therefrom; and comparing said first and second sets of data to identify changes in the reflection of seismic signals obtained in said second survey thereby delineating the locations of said gas in said formation and the permeable extent thereof.

7. The method of claim 6 which is further characterized to include the steps of:

conducting a series of seismic surveys of said formation while said gas is being introduced therein to obtain successive sets of data representing reflections of seismic signals therefrom; and comparing said successive sets of data with said first set of data to identify changes in the reflections of seismic signals obtained thereby delineating the paths traveled by said gas in said formation.

8. The method of claim 6 wherein said gas is of a type which does not liquefy at the temperatures and pressures present in said formation.

9. The method of claim 6 wherein said gas is of a type which does not substantially react or combine with oil, water, or other materials contained in said formation.

10. The method of claim 6 wherein said gas is selected from the group consisting of hydrogen, helium, nitrogen or oxygen.

* * * * *